(12) United States Patent
Tsuyoshi (10) Patent No.: US 12,431,809 B2
(45) Date of Patent: Sep. 30, 2025

(54) INTEGRATED CIRCUIT AND POWER SUPPLY CIRCUIT

(71) Applicant: FUJI ELECTRIC CO., LTD., Kawasaki (JP)

(72) Inventor: Yoshizawa Tsuyoshi, Nagano (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 231 days.

(21) Appl. No.: 18/453,893

(22) Filed: Aug. 22, 2023

(65) Prior Publication Data

US 2024/0113628 A1 Apr. 4, 2024

(30) Foreign Application Priority Data

Sep. 30, 2022 (JP) ................ 2022-158453

(51) Int. Cl.
  *H02M 3/335* (2006.01)
  *H02M 1/00* (2006.01)
  *H02M 3/00* (2006.01)

(52) U.S. Cl.
  CPC ..... *H02M 3/33507* (2013.01); *H02M 1/0009* (2021.05); *H02M 3/01* (2021.05)

(58) Field of Classification Search
  CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219;
  (Continued)

(56) References Cited

U.S. PATENT DOCUMENTS 10,193,436 B2* 1/2019 Chen .................... H02M 3/3376
10,253,744 B2* 4/2019 Garrard ............. H02M 3/33515
(Continued)

FOREIGN PATENT DOCUMENTS

| JP | WO2016/117230 A1 | 4/2017 |
|---|---|---|
| JP | 2017-127108 A | 7/2017 |
| JP | 2021-065079 A | 4/2021 |

*Primary Examiner* — Jeffrey A Gblende
(74) *Attorney, Agent, or Firm* — RABIN & BERDO, P.C.

(57) ABSTRACT

An integrated circuit for a power supply circuit that generates an output voltage, and that includes: a transformer including primary and secondary coils, first and second transistors controlling a current of the primary coil, and a resonant circuit including the primary coil and a first capacitor. The integrated circuit controls the first and second transistors. The integrated circuit includes: a voltage generator circuit supplying a first current to a second capacitor, and to generate a first voltage at the second capacitor; a driving signal output circuit outputting a driving signal for driving the first and second transistors, based on the first voltage and a feedback voltage corresponding to the output voltage; and a control circuit controlling the voltage generator circuit such that, when the output voltage drops and a derivative of the feedback voltage at a time point is greater than a predetermined value, the first current increases and then decreases.

12 Claims, 9 Drawing Sheets

(58) Field of Classification Search
CPC ............. H02M 7/4815; H02M 1/0048; H02M 7/4818; H02M 7/4826; H02M 7/4833; Y02B 70/1491
See application file for complete search history.

(56) References Cited

U.S. PATENT DOCUMENTS

| | | | |
|---|---|---|---|
| 10,924,021 B2* | 2/2021 | Yoshizawa | ........ H02M 3/33507 |
| 2017/0110974 A1 | 4/2017 | Chen | |
| 2017/0201183 A1* | 7/2017 | Chen | ................. H02M 3/33546 |

* cited by examiner

INTEGRATED CIRCUIT AND POWER SUPPLY CIRCUIT

CROSS-REFERENCE TO RELATED APPLICATION

The present application claims priority pursuant to 35 U.S.C. § 119 from Japanese patent application number 2022-158453 filed on Sep. 30, 2022, the entire disclosure of which is hereby incorporated by reference herein.

BACKGROUND

Technical Field

The present disclosure relates to an integrated circuit and a power supply circuit.

Description of the Related Art

Integrated circuits for controlling LLC current resonance converters includes a load detection circuit that detects a state of a load based on resonant currents, in some cases (for example, Japanese Patent Application Publication Nos. 2021-065079 and 2017-127108).

The load detection circuit described above generates, for example, a voltage depending on a load current flowing through the load (herein referred to as a "load detection voltage") in order to make an output voltage of the converter reach a target level. Then, based on the load detection voltage, the integrated circuit changes the drive mode of a switching device of the converter, and maintains the output voltage at the target level.

Specifically, when the state of the load is a light load state, the integrated circuit switches the switching device in a drive mode in which the switching device is intermittently switched, and suppresses a rise in the output voltage, for example. Then, when the state of the load changes from the light load state to a normal load state, the integrated circuit switches the switching device in a drive mode in which the switching device is continuously switched, and suppresses a drop in the output voltage, for example.

Therefore, when a change in the load detection voltage can follow a change in the state of the load, the integrated circuit can maintain the output voltage at the target level in response to the change in the state of the load. On the other hand, when the state of the load suddenly changes, the change in the load detection voltage may fail to follow the change in the state of the load.

In this case, for example, when the state of the load suddenly changes from the light load state to the normal load state, there is generated a time period in which the load detection voltage does not reach a level at which the switching device needs to be continuously switched. Thus, the integrated circuit continues to intermittently switch the switching device during the time period. This makes the output voltage drop from the target level during the time period.

SUMMARY

A first aspect of the present disclosure is an integrated circuit for a power supply circuit that generates an output voltage of a target level, the power supply circuit including a transformer including a primary coil and a secondary coil, a first transistor and a second transistor configured to control a current of the primary coil, and a resonant circuit including the primary coil and a first capacitor, the power supply circuit driving a load with a load current flowing therethrough, the integrated circuit being configured to control switching of the first transistor and the second transistor of the power supply circuit, the integrated circuit comprising: a terminal configured to have a second capacitor coupled thereto; a voltage generator circuit configured to supply a first current to the second capacitor in response to a resonant current of the resonant circuit, and to generate, at the second capacitor, a first voltage corresponding to the load current flowing through the load of the power supply circuit; a driving signal output circuit configured to output a driving signal for driving the first transistor and the second transistor, based on the first voltage and a feedback voltage corresponding to the output voltage; and a control circuit configured to control the voltage generator circuit such that, when the output voltage drops and a derivative of the feedback voltage at a time point becomes greater than a predetermined value, the first current increases and then decreases.

A second aspect of the present disclosure is a power supply circuit configured to generate an output voltage of a target level, and driving a load with a load current flowing therethrough, the power supply circuit comprising: a transformer including a primary coil and a secondary coil; a first transistor and a second transistor configured to control a current of the primary coil; a first capacitor forming a resonant circuit with the primary coil; a second capacitor; and an integrated circuit configured to control switching of the first transistor and the second transistor, wherein the integrated circuit includes a terminal to which the second capacitor is coupled; a voltage generator circuit configured to supply a first current to the second capacitor in response to a resonant current of the resonant circuit, and to generate, at the second capacitor, a first voltage corresponding to the load current flowing through the load of the power supply circuit; a driving signal output circuit configured to output a driving signal for driving the first transistor and the second transistor, based on the first voltage and a feedback voltage corresponding to the output voltage; and a control circuit configured to control the voltage generator circuit such that, when the output voltage drops and a derivative of the feedback voltage at a time point becomes greater than a predetermined value, the first current increases and then decreases.

A third aspect of the present disclosure is an integrated circuit for a power supply circuit that generates an output voltage of a target level, the power supply circuit including a transformer including a primary coil and a secondary coil, a first transistor and a second transistor configured to control a current of the primary coil, a resonant circuit including the primary coil and a first capacitor, and a current detection circuit configured to receive a resonant current of the resonant circuit and generate a current detection voltage, the integrated circuit being configured to control switching of the first transistor and the second transistor of the power supply circuit, the integrated circuit comprising: an averaged circuit configured to generate a load-current instruction voltage by averaging the current detection voltage received from the current detection circuit; a driving signal output circuit configured to output a driving signal for driving the first transistor and the second transistor, based on the load-current instruction voltage and a feedback voltage corresponding to the output voltage; and a control circuit configured to control the averaged circuit such that, when the output voltage drops and a derivative of the feedback voltage at a time point becomes greater than a predetermined value, a derivative of the load-current instruction voltage at each time point thereafter increases and then decreases.

A forth aspect of the present disclosure is a power supply circuit configured to generate an output voltage of a target level, the power supply circuit comprising: a transformer including a primary coil and a secondary coil; a first transistor and a second transistor configured to control a current of the primary coil; a first capacitor forming a resonant circuit with the primary coil; a current detection circuit configured to receive a resonant current of the resonant circuit and generate a current detection voltage; and an integrated circuit configured to control switching of the first transistor and the second transistor, wherein the integrated circuit includes an averaged circuit configured to generate a load-current instruction voltage by averaging the current detection voltage received from the current detection circuit; a driving signal output circuit configured to output a driving signal for driving the first transistor and the second transistor, based on the load-current instruction voltage and a feedback voltage corresponding to the output voltage; and a control circuit configured to control the averaged circuit such that, when the output voltage drops and a derivative of the feedback voltage at a time point is greater than a predetermined value, a derivative of the load-current instruction voltage at each time point thereafter increases and then decreases.

BRIEF DESCRIPTION OF THE DRAWINGS

FIG. 2 is a diagram illustrating an example of a control IC 40a.

FIG. 6 is a diagram of an example of main waveforms illustrating an operation of the control IC 40a.

FIG. 7 is a diagram illustrating an example of an operation of the control IC 40a.

DETAILED DESCRIPTION

At least following matters will become apparent from the descriptions of the present specification and the accompanying drawings.

Embodiments

<<<Overview of Switching Power Supply Circuit 10>>>

Figure 1:
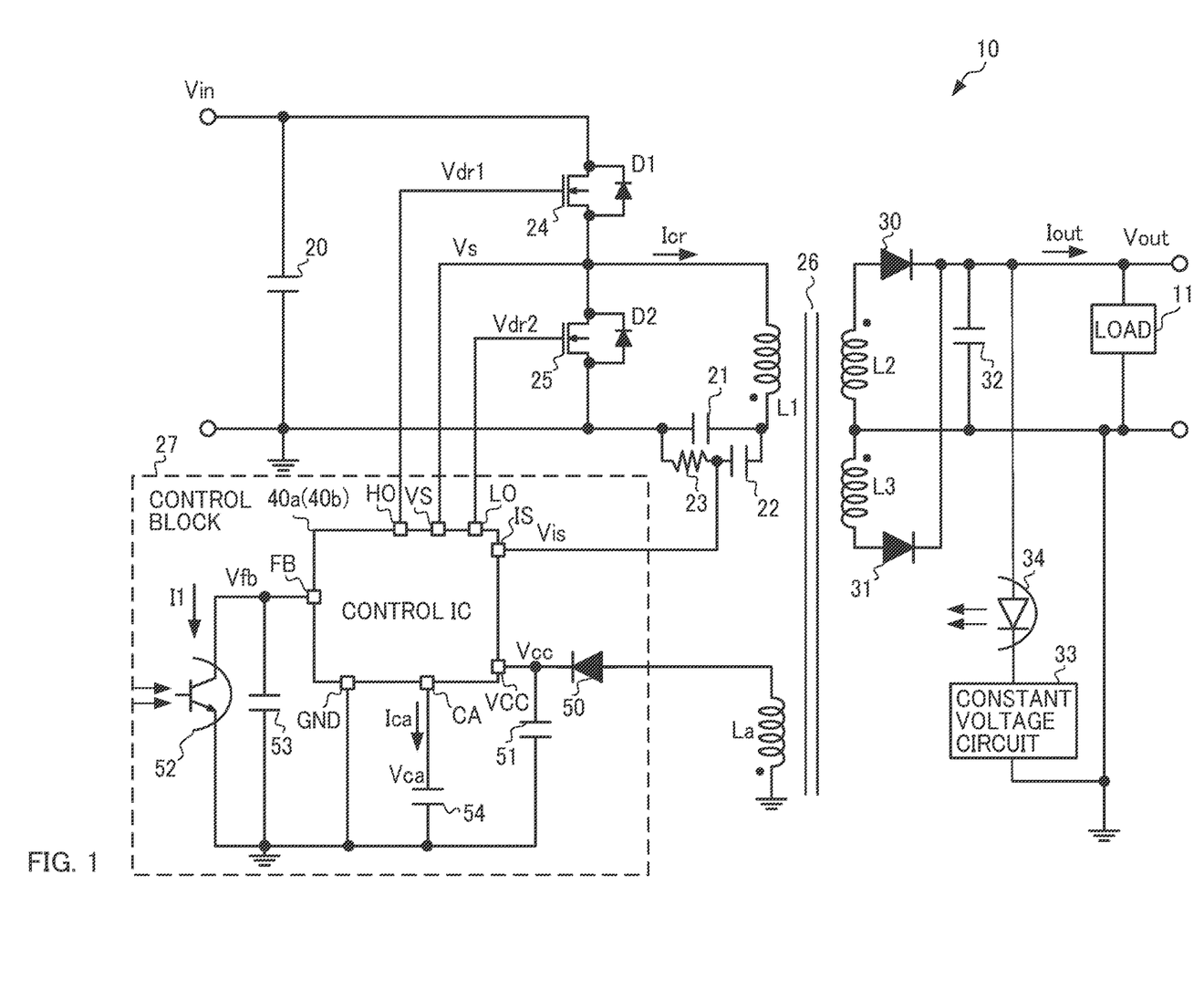
FIG. 1 is a diagram illustrating one example of a switching power supply circuit 10.

FIG. 1 is a diagram illustrating an example configuration of a switching power supply circuit 10, which is an embodiment of the present disclosure. The switching power supply circuit is an LLC current resonance power supply circuit that generates, at the load 11, an output voltage Vout at a target level from a predetermined input voltage Vin.

The switching power supply circuit 10 includes capacitors 20, 21, 22, and 32, a resistor 23, N-channel metal-oxide-semiconductor (NMOS) transistors 24 and 25, a transformer 26, a control block 27, diodes 30 and 31, a voltage regulator circuit 33, and a light-emitting diode 34.

The capacitor 20 stabilizes a voltage between a power supply line that receives the input voltage Vin and a ground line on a ground side, to remove noise and the like. The input voltage Vin is a direct-current (DC) voltage at a predetermined level. The capacitor 21 is a so-called resonance capacitor configuring a resonant circuit with a leakage inductance between a primary coil L1 and secondary coils L2 and L3. The capacitor 21 corresponds to a "first capacitor".

The capacitor 22 and the resistor 23 configure a detection circuit that shunts and detects a resonant current Icr flowing through the capacitor 21. The capacitor 22 and the resistor 23, which are coupled in series, are coupled in parallel with the capacitor 21.

The resistor 23 generates a voltage Vis, based on the current obtained by shunting the resonant current Icr. Accordingly, the voltage Vis results in a voltage corresponding to the resonant current Icr. Note that the resonant current Icr when flowing in the direction given in FIG. 1 is referred to as positive resonant current Icr, and in this case it is assumed that the voltage Vis is a positive voltage. When the resonant current Icr flows in the direction of the arrow, in other words, when the resonant current Icr flows in the order of the primary coil L1, the capacitor 22, and the resistor 23, the direction of the resonant current Icr is positive. Meanwhile, when the resonant current Icr flows in the direction opposite to the direction of the arrow, in other words, when the resonant current Icr flows in the order of the resistor 23, the capacitor 22, and the primary coil L1, the direction of the resonant current Icr is negative. Note that the detection circuit including the capacitor 22 and the resistor 23 corresponds to an "external current detection circuit", and the voltage Vis corresponds to a "current detection voltage".

The NMOS transistor 24 is a high-side power transistor, and the NMOS transistor 25 is a low-side power transistor. Specifically, the NMOS transistors 24 and 25 are coupled in series between a node to receive the input voltage Vin and a node to receive a ground voltage. In an embodiment of the present disclosure, the NMOS transistors 24 and 25 are used as switching devices, however, for example, P-channel metal-oxide-semiconductor (PMOS) transistors or bipolar transistors may be used. The NMOS transistor 24 corresponds to a "first transistor", and the NMOS transistor 25 corresponds to a "second transistor".

The transformer 26 includes the primary coil L1, the secondary coils L2 and L3, and an auxiliary coil La. The primary coil L1, the secondary coils L2 and L3, and the auxiliary coil La are insulated from one another. In the transformer 26, voltages are generated in the secondary coils L2, L3 on the secondary side and the auxiliary coil La, according to variation in the voltage at the primary coil L1 on the primary side.

The primary coil L1 has one end to which the source of the NMOS transistor 24 and the drain of the NMOS transistor 25 are coupled, and the other end to which the source of the NMOS transistor 25 is coupled through the capacitor 21.

Accordingly, upon start of switching of the NMOS transistors 24 and 25, each of the voltages at the secondary coils L2 and L3 and the auxiliary coil La varies. Note that the primary coil L1 and the secondary coils L2 and L3 are electromagnetically coupled with different polarities, and the primary coil L1 and the auxiliary coil La are electromagnetically coupled with the same polarity.

The control block 27 is a circuit block that controls switching of the NMOS transistors 24 and 25, which will be described later in detail.

The diodes 30 and 31 rectify the voltage at the secondary coils L2 and L3, and the capacitor 32 smoothes the rectified voltage. As a result, the output voltage Vout having been smoothed is generated at the capacitor 32. The output voltage Vout results in reaching a DC voltage at a target level.

The voltage regulator circuit 33 generates a constant DC voltage, and is configured using a shunt regulator, for example.

The light-emitting diode 34 is an element to emit light with an intensity corresponding to a difference between the output voltage Vout and the output of the voltage regulator circuit 33, and configures a photocoupler with a phototransistor 52 which will be described later. In an embodiment of the present disclosure, the intensity of the light from the light-emitting diode 34 increases with a rise in the level of the output voltage Vout.

<<<Control Block 27>>>

The control block 27 includes a control IC 40a, a diode 50, capacitors 51, 53, 54, and the phototransistor 52.

The control IC 40a is an integrated circuit that controls switching of the NMOS transistors 24 and 25, and has terminals VCC, GND, FB, IS, CA, HO, LO, and VS.

The terminal VCC is a terminal to which a power supply voltage Vcc to operate the control IC 40a is applied, and to which the cathode of the diode 50 and the capacitor 51 having one end grounded are coupled. Then, the capacitor 51 is charged with the voltage from the auxiliary coil La of the transformer 26, resulting in the voltage Vcc. Note that the control IC 40a is activated upon application of the divided voltage of the input voltage Vin obtained by rectifying an alternating current (AC) input through a terminal (not illustrated), and after being activated, the control IC 40a operates based on the power supply voltage Vcc.

The terminal GND is a terminal to which the ground voltage is applied, and to which, for example, the housing of a device where the switching power supply circuit 10 is provided or the like is coupled.

The terminal FB is a terminal at which a feedback voltage Vfb corresponding to the output voltage Vout is generated, and to which the phototransistor 52 and the capacitor 53 are coupled. The phototransistor 52 passes, from the terminal FB to the ground, a bias current Il having a magnitude corresponding to the intensity of the light from the light-emitting diode 34, and the capacitor 53 is provided to remove noise between the terminal FB and the ground. Thus, the phototransistor 52 operates as a transistor to generate a sink current.

The terminal IS is a terminal to detect the current value of the resonant current of the primary coil L1. Here, the voltage corresponding to the current value of the resonant current of the primary coil L1 is generated at the node at which the capacitor 22 and the resistor 23 are coupled. Thus, the voltage Vis corresponding to the current value of the resonant current of the primary coil L1 is applied to the terminal IS.

The terminal CA is a terminal that supplies a current Ica based on the resonant current of the primary coil L1 to the capacitor 54 which is coupled to the terminal CA. A voltage Vca corresponding to the input power of the switching power supply circuit 10 is applied to the terminal CA. The voltage Vca is a voltage that is generated from the current Ica, at the capacitor 54. Note that the voltage Vca corresponds to a "first voltage" and a "load-current instruction voltage", and the capacitor 54 corresponds to a "second capacitor".

The terminal HO is a terminal through which a driving signal Vdr1 to drive the NMOS transistor 24 is outputted, and to which the gate of the NMOS transistor 24 is coupled.

The terminal L0 is a terminal through which a driving signal Vdr2 to drive the NMOS transistor 25 is outputted, and to which the gate of the NMOS transistor 25 is coupled.

The terminal VS is a terminal to receive a voltage at the coupling node at which the source terminal of the NMOS transistor 24 and the drain terminal of the NMOS transistor are coupled. Upon turning on of the NMOS transistor 24, the input voltage Vin is applied, and upon turning on of the NMOS transistor 25, the ground voltage is applied.

The potential of a voltage Vs at the terminal VS is the reference potential of the output voltage of a bootstrap circuit (not illustrated) for turning on the NMOS transistor 24 when the input voltage Vin is being applied to the terminal VS.

<<<Details of Control IC 40a:>>>

Figure 2:
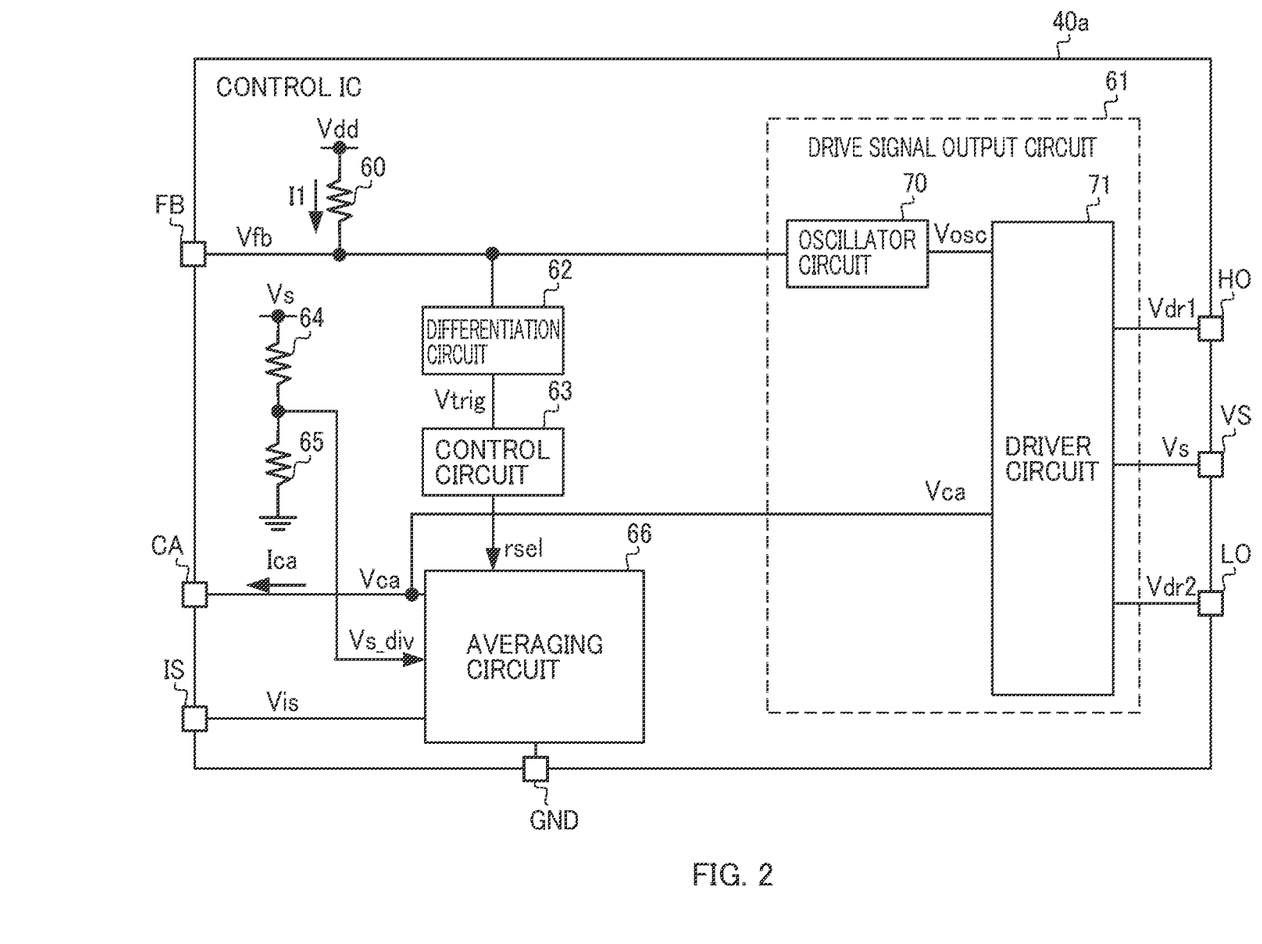

FIG. 2 is a diagram illustrating an example of the control IC 40a. The control IC 40a is an integrated circuit that switches the NMOS transistors 24 and 25, based on the resonant current Icr and the feedback voltage Vfb. The control IC 40a includes resistors 60, 64, and 65, a driving signal output circuit 61, a differentiator circuit 62, a control circuit 63, and an averaged circuit 66. Note that the terminal VCC is omitted herein for the sake of convenience.

===Resistor 60===

The resistor 60 generates the feedback voltage Vfb, based on the bias current Il from the phototransistor 52. Note that the resistor 60 has one end to receive a predetermined voltage Vdd, and the other end coupled to the terminal FB. Thus, the feedback voltage Vfb generated in the terminal FB is given by the following expression (1).

$$Vfb = Vdd - R \times I1 \qquad (1)$$

where R is the resistance value of the resistor 60. As described above, in an embodiment of the present disclosure, the current value of the bias current Il increases with a rise in the output voltage Vout. Thus, upon a rise in the output voltage Vout, the feedback voltage Vfb drops.

===Driving Signal Output Circuit 61===

The driving signal output circuit 61 outputs the driving signals Vdr1 and Vdr2 to drive the NMOS transistors 24 and 25. Specifically, the driving signal output circuit 61 outputs the driving signals Vdr1 and Vdr2, based on the feedback voltage Vfb and the voltage Vca. The driving signal output circuit 61 includes an oscillator circuit 70 and a driver circuit 71.

===Oscillator Circuit 70===

The oscillator circuit 70 is a voltage control oscillator circuit that outputs an oscillator signal Vosc to the driver circuit 71, based on the inputted feedback voltage Vfb. The oscillator signal Vosc is a signal used to switch the NMOS transistors 24 and 25, and has a 50% high-level (hereinafter high or high level) duty cycle, for example. Note that, upon drop in the level of the voltage Vfb, the oscillator circuit 70 outputs the oscillator signal Vosc with a high frequency. On the other hand, upon rise in the level of the voltage Vfb, the oscillator circuit 70 outputs the oscillator signal Vosc with a low frequency.

===Driver Circuit 71===

The driver circuit 71 drives the NMOS transistors 24 and 25, based on the oscillator signal Vosc, and the voltage Vca from the averaged circuit 66 (described later). Details of the driver circuit 71 will be described later.

==Differentiator Circuit 62==

The differentiator circuit 62 differentiates the voltage Vfb. Then, the differentiator circuit 62 outputs a pulsed signal Vtrig when the feedback voltage Vfb suddenly rises due to drop in the output voltage Vout. Specifically, the differentiator circuit 62 outputs the pulsed signal Vtrig while a voltage dVfb/dt obtained by differentiating the voltage Vfb exceeds a reference voltage Vref0 (not illustrated). In other words, upon drop in the output voltage Vout, when the change amount dVfb/dt of the voltage Vfb per time is greater than a predetermined value, the pulsed signal Vtrig is output. Note that the voltage obtained by differentiating the voltage Vfb corresponds to a "derivative of the feedback voltage at a time point", and the reference voltage Vref0 corresponds to a "predetermined value".

==Control Circuit 63==

The control circuit 63 detects, based on the signal Vtrig, that the output voltage Vout drops and the change amount dVfb/dt of the voltage Vfb per time results in being greater than a predetermined value. Then, when the output voltage Vout has dropped and the change amount dVfb/dt of the voltage Vfb per time results in being greater than the predetermined value, the control circuit 63 controls the averaged circuit 66 such that the current Ica supplied from the terminal CA increases and then decreases. In other words, when the output voltage Vout has dropped and the change amount dVfb/dt of the voltage Vfb per time results in being greater than the predetermined value, the control circuit 63 controls the averaged circuit 66 such that the change amount of the voltage Vca per time increases and then decreases.

Specifically, in response to the pulsed signal Vtrig being outputted, the control circuit 63 outputs a high signal rse1 only for a predetermined time period P. Subsequently, the control circuit 63 outputs the low-level (hereinafter low or low level) signal rse1.

Although details will be described later, thus, when the output voltage Vout has dropped and the change amount dVfb/dt of the voltage Vfb per time results in being greater than the predetermined value, the control circuit 63 controls the averaged circuit 66 such that the current Ica increases only for the predetermined period P. In other words, thus, when the output voltage Vout has dropped and the change amount dVfb/dt of the voltage Vfb per time results in being greater than the predetermined value, the control circuit 63 controls the averaged circuit 66 such that a change amount of the voltage Vca per time increases only for the predetermined time period P.

==Resistors 64 and 65==

The resistors 64 and 65 divide the voltage Vs, to generate a voltage Vs_div at the coupling point at which the resistors 64 and 65 are coupled. Note that, upon turning on of the NMOS transistor 24 and turning off of the NMOS transistor 25, the voltage Vs results in the input voltage Vin, and in response to turning off of the NMOS transistor 24 and turning on of the NMOS transistor 25, the voltage Vs results in the ground voltage. In other words, upon turning on and off of the NMOS transistors 24 and 25, the voltage Vs results in either the input voltage Vin or the ground voltage. In association therewith, upon turning on and off of the NMOS transistors 24 and 25, the voltage Vs_div changes between a voltage depending on the input voltage Vin and the ground voltage.

==Averaged Circuit 66==

Figure 3:
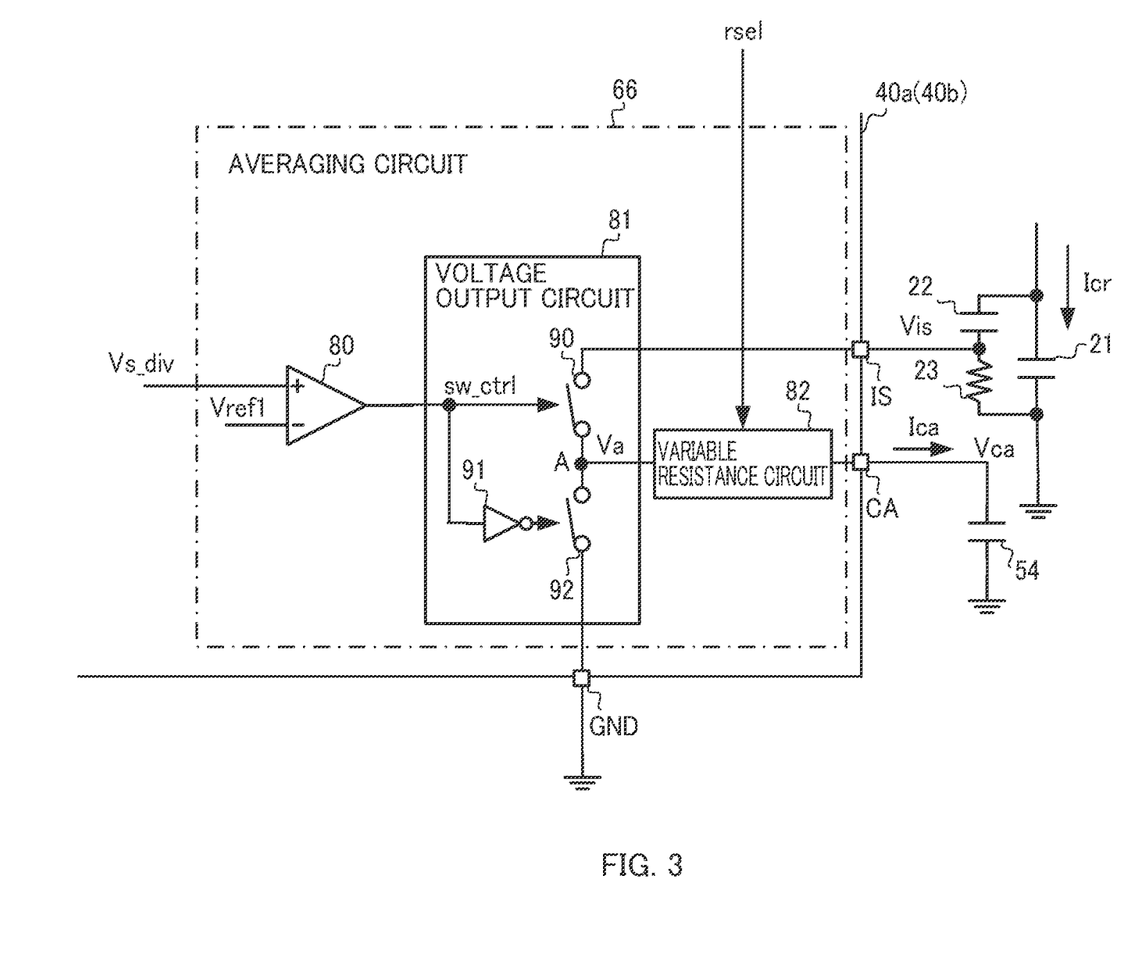
FIG. 3 is a diagram illustrating one example of an averaged circuit 66.

FIG. 3 is a diagram illustrating an example of the averaged circuit 66. The averaged circuit 66 supplies the current Ica corresponding to the resonant current Icr and the signal rse1 to the capacitor 54, and generates at the capacitor 54 the voltage Vca according to the load current Iout flowing through the load 11. In other words, the averaged circuit 66 generates the voltage Vca by averaging the positive voltage Vis that is based on the positive resonant current Icr. Note that the current Ica corresponds to a "first current".

Specifically, using a variable resistance circuit 82 (described later) having a resistance value that varies in response to the signal rse1, the averaged circuit 66 averages according to the voltage Vs_div the positive voltage Vis generated by the resonant current Icr flowing in the positive direction, and the ground voltage. Note that the averaged circuit 66 corresponds to a "voltage generator circuit".

As illustrated in FIG. 3, the averaged circuit 66 includes a comparator 80, a voltage output circuit 81, and the variable resistance circuit 82.

==Comparator 80==

The comparator 80 is a circuit that outputs a signal sw_ctrl a logic level of which changes similarly to the voltage Vs changing between the input voltage Vin and the ground voltage. Specifically, when the NMOS transistor 24 turns on and the voltage Vs_div is higher than the reference voltage Vref1, the comparator 80 outputs a high signal sw_ctrl. On the other hand, when the NMOS transistor 25 turns on and the voltage Vs_div is lower than the reference voltage Vref1, the comparator 80 outputs a low signal sw_ctrl.

As described above, in response to turning on of the NMOS transistor 24, the resonant current Icr flows in the positive direction, and in response to turning on of the NMOS transistor 25, the resonant current Icr flows in the negative direction. Therefore, when the resonant current Icr flows in the positive direction, the signal sw_ctrl goes high, and, when the resonant current Icr flows in the negative direction, the signal sw_ctrl goes low. Note that the comparator 80 corresponds to a "control signal output circuit", and the signal sw_ctrl corresponds to a "control signal".

==Voltage Output Circuit 81==

The voltage output circuit 81 outputs the ground voltage or the voltage Vis that is detected at the terminal IS and that corresponds to the resonant current Icr of the primary coil L1, to the variable resistance circuit 82 (described later). Specifically, the voltage output circuit 81 outputs the voltage Vis to a node A when the logic level of the signal sw_ctrl is high, and outputs the ground voltage to the node A when the logic level of the signal sw_ctrl is low. Note that the ground voltage corresponds to a "predetermined voltage", the high level corresponds to a "first level", and the low level corresponds to a "second level".

The voltage output circuit 81 supplies the current Ica to the terminal CA through the variable resistance circuit 82 (described later), and generates the voltage Vca at the capacitor 54 coupled to the terminal CA.

Note that the current value of the resonant current Icr of the primary coil L1 increases according to the input power of the switching power supply circuit 10. Further, the input power of the switching power supply circuit 10 increases according to the power consumed by the load 11. Thus, the voltage Vca rises higher as the load 11 becomes under heavier load condition (i.e., as the load current Iout of the load 11 increases).

The voltage output circuit 81 includes switches 90 and 92 and an inverter 91.

The switch 90 is an element that turns on when the comparator 80 outputs a high signal sw_ctrl. In response to turning on of the switch 90, the voltage Va of the node A at which the switches 90 and 92 are coupled results in the voltage Vis of the terminal IS.

The switch 92 is an element that turns on when the comparator 80 outputs a high signal sw_ctrl and the inverter 91 outputs a high signal. In response to turning on of the switch 92, the voltage Va of the node A results in the ground voltage.

Then, the variable resistance circuit 82 is provided between the node A and the terminal CA. The variable resistance circuit 82 and the capacitor 54 coupled to the terminal CA configures an RC integrator circuit. It is assumed that the "time constant i" of the RC integrator circuit is sufficiently longer than the period of the driving signals Vdr1 and Vdr2 for driving the NMOS transistors 24 and 25.

Therefore, when the comparator 80 outputs a high signal sw_ctrl, the voltage output circuit 81 charges the capacitor 54, through the variable resistance circuit 82, with the voltage Vis that is based on the positive resonant current Icr corresponding to the power consumption of the load 11.

On the other hand, when the comparator 80 outputs a low signal sw_ctrl, the voltage output circuit 81 discharges the capacitor 54 through the variable resistance circuit 82.

This makes the averaged circuit 66 possible to average the voltage Vis, to thereby output the voltage Vca indicating the load current Iout.

===Variable Resistance Circuit 82===

The variable resistance circuit 82 decreases a resistance value based on the signal rse1 from the control circuit 63 when the output voltage Vout has dropped and the change amount dVfb/dt of the voltage Vfb per time results in being greater than the predetermined value. Specifically, when the control circuit 63 outputs the high signal rse1 only for the predetermined time period P, the resistance value of the variable resistance circuit 82 results in a resistance value Ra. Subsequently, when the control circuit 63 outputs the low signal rse1, the resistance value of the variable resistance circuit 82 results in a resistance value Rb. Note that the resistance value Rb is greater than the resistance value Ra.

In other words, the "time constant i" of the RC integrator circuit that includes the variable resistance circuit 82 and the capacitor 54 changes based on the signal rse1 from the control circuit 63. Note that, when the signal rse1 is low, the "time constant i"=Rb×Cl, where Cl is the capacitance value of the capacitor 54. In this case, the "time constant i" is defined as a time constant T1. Meanwhile, when the signal rse1 is high, the "time constant i"=Ra×Cl. In this case, the "time constant i" is defined as a time constant T2. Note that, in this case, since the resistance value Rb is greater than the resistance value Ra, the time constant T1 is greater than the time constant T2. The resistance value Ra corresponds to a "first resistance value", and the resistance value Rb corresponds to a "second resistance value".

===Driver Circuit 71===

The driver circuit 71 in FIG. 2 drives the NMOS transistors 24 and 25 in FIG. 1, based on the oscillator signal Vosc and the voltage Vca. Specifically, the driver circuit 71 switches the NMOS transistors 24 and 25 by a continuous switching operation such that the driving signals Vdr1 and Vdr2 alternately become high level as illustrated in FIG. 4 according to the oscillator signal Vosc, based on that the voltage Vca is higher than a reference voltage Vref2 (not illustrated) and based on indicating that the load 11 is in a normal load state.

Figure 5:
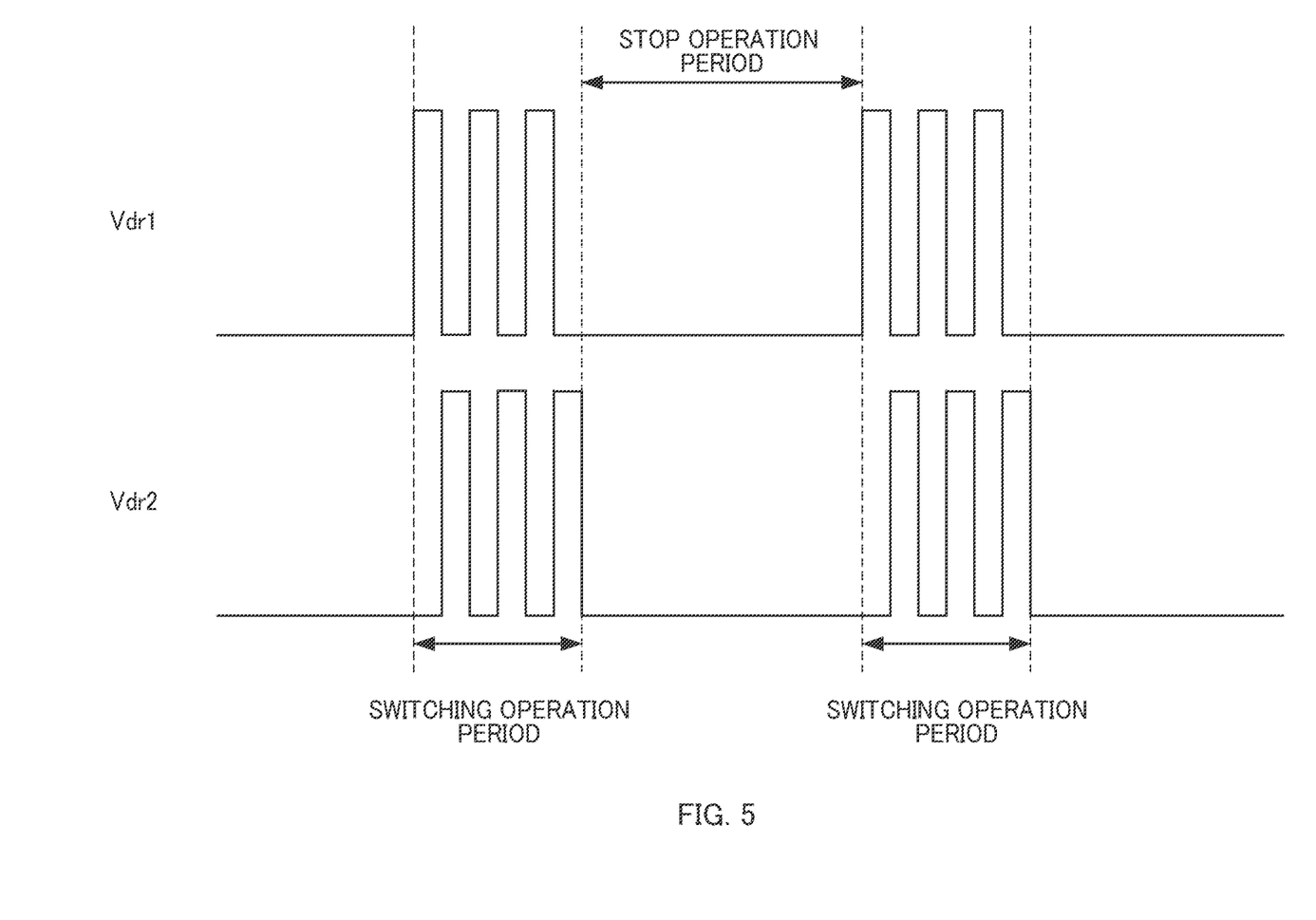
FIG. 5 is a chart illustrating an example of the driving signals Vdr1 and Vdr2 when the load 11 is in a light load state.

The driver circuit 71 switches the NMOS transistors 24 and 25 such that the continuous switching operation and a stop operation of intermittently stopping the switching operation are repeated as illustrated in FIG. 5 according to the oscillator signal Vosc, based on that the voltage Vca is lower than the reference voltage Vref2 and based on indicating that the load 11 is in a light load state.

Figure 4:
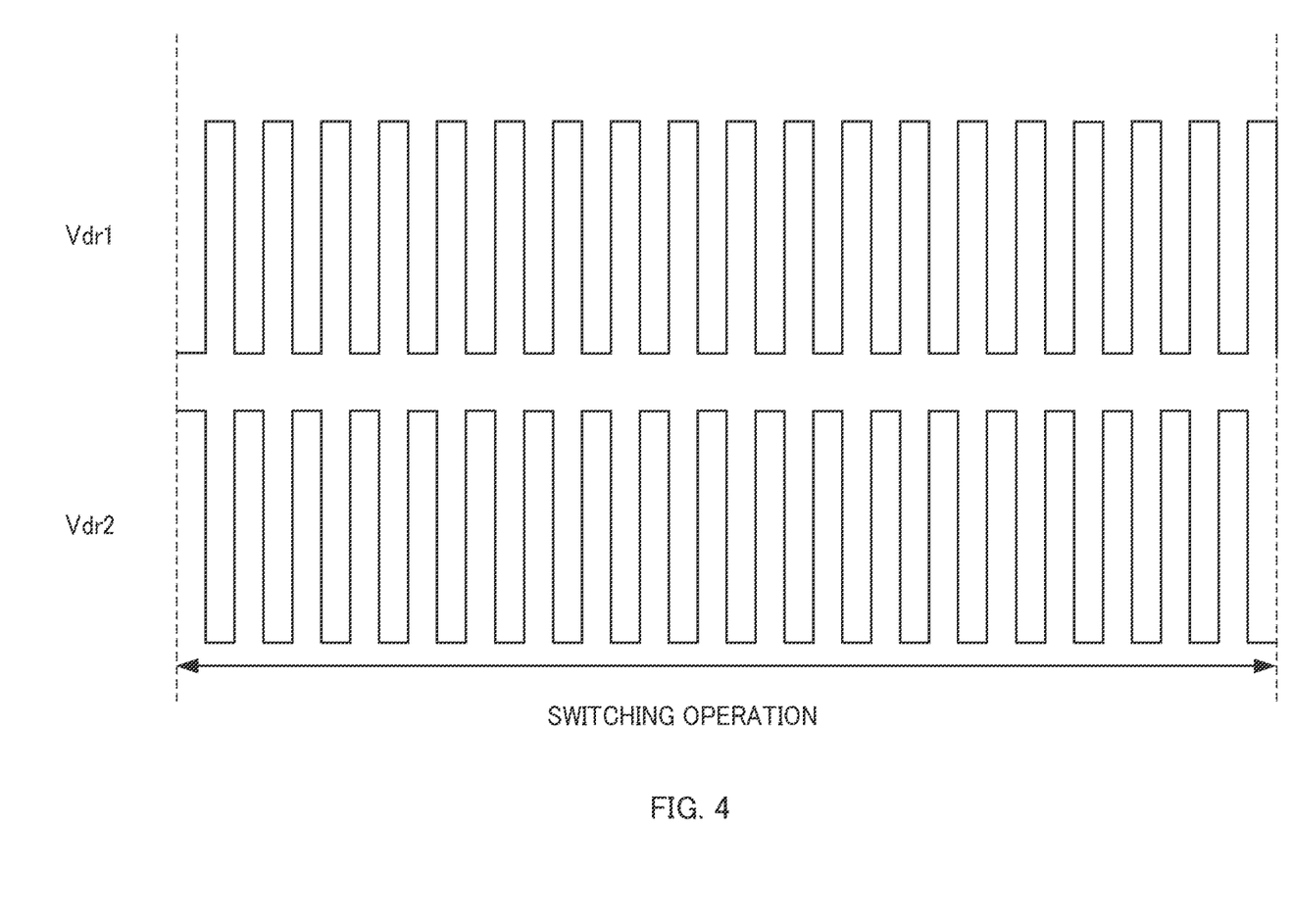
FIG. 4 is a chart illustrating an example of driving signals Vdr1 and Vdr2 when a load 11 is in a normal load state.

Further, in FIGS. 4 and 5, the driver circuit 71 is illustrated so as to output the driving signals Vdr1 and Vdr2 that are generated to have 50% duty cycle corresponding to the oscillator signal Vosc, and that alternately go high.

However, the driver circuit 71 actually outputs the driving signals Vdr1 and Vdr2 that have a dead time, that are generated to have approximately 50% duty cycle corresponding to the oscillator signal Vosc, and that alternately go high. Note that, FIG. 5 illustrates such that the driving signals Vdr1 and Vdr2 have the same number of pulses during the switching operation, however, it is merely an example, and the number of pulses may be different therebetween.

Here, the "dead time" is, for example, a time period since the high driving signal Vdr1 reaches to low level until the driving signal Vdr2 reaches to high level, and is a time period during which both of the driving signals Vdr1 and Vdr2 are low.

Note that the phrase "the load 11 is in the heavy load state" indicates a case in which the current value of the load current Iout flowing through the load 11 is equal to or larger than a first predetermined value (e.g., 5 A), for example. Moreover, the phrase "the load 11 is in a normal load state" indicates a case in which the current value of the load current Iout flowing through the load 11 is between the first predetermined value and a second predetermined value (e.g., 1 A to 5 A), for example. Moreover, the phrase "the load 11 is in the light load state" indicates a case in which the current value of the load current Iout flowing through the load 11 is smaller than the second predetermined value (e.g., 1 A), for example. Further, a description has been given such that the current value of the load current Iout to determine whether the load 11 is in the normal load state or in the light load state is 1 A, for example, but this current value can be variously set. The foregoing setting is changed in various ways by setting the reference voltage Vref2 by the driver circuit 71 that receives the voltage Vca. Whether the normal load state or the light load state is determined by the driver circuit 71 based on the voltage Vca.

<<<Relationship Between Voltage Vca and Voltage Vis>>>

Figure 6:
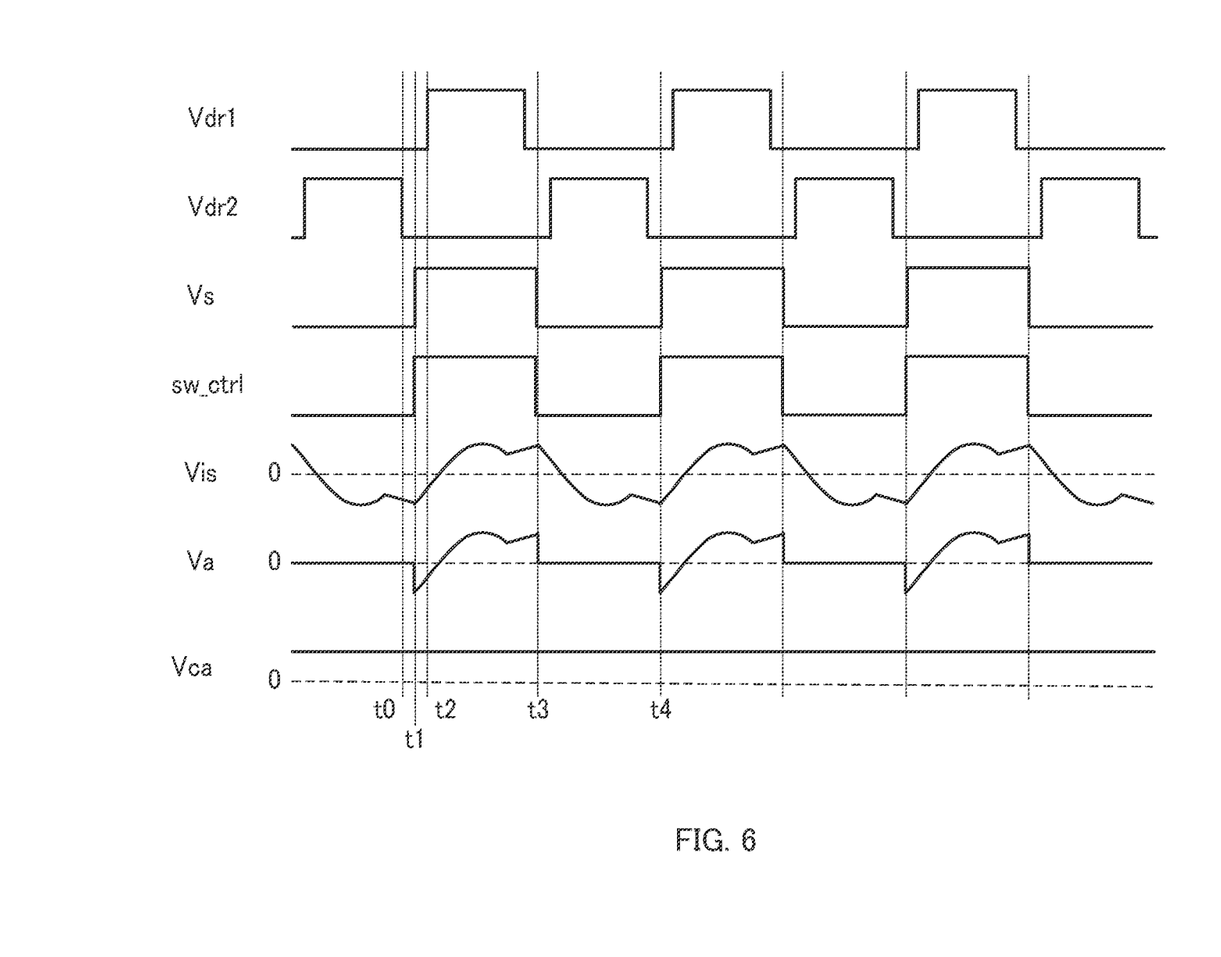

FIG. 6 is a diagram of an example of main waveforms illustrating an operation of the control IC 40a. It is assumed that the resistance value of the variable resistance circuit 82 is the resistance value Rb, for example.

At time t0, the driver circuit 71 of the control IC 40a outputs the low driving signal Vdr2, to thereby turn off the NMOS transistor 25.

Subsequently, the voltage Vs of the terminal VS rises such that the negative resonant current Icr flows through the node that receives the voltage Vin through the diode D1. Then, at time t1, the voltage Vs is half the voltage of the input voltage Vin. In association therewith, the resistors 64 and 65 in FIG. 2 generate the voltage Vs_div corresponding to the voltage Vs, and the comparator 80 in FIG. 3 outputs the high signal sw_ctrl.

In this event, the switch 90 in FIG. 3 is turned on in response to the high signal sw_ctrl, and the voltage output circuit 81 outputs the voltage Vis to the node A. Accordingly, the voltage output circuit 81 charges the capacitor 54 through the variable resistance circuit 82. At this time, the averaged circuit 66 supplies the current Ica to the capacitor 54.

At time t2 at which the dead time has elapsed since the time t0, the driver circuit 71 outputs the high driving signal Vdr1, to thereby turn on the NMOS transistor 24. Then, the voltage Vis corresponding to the resonant current Icr flowing in the positive direction results in positive.

After the driver circuit 71 outputs the low driving signal Vdr1, the voltage Vs of the terminal VS drops such that the positive resonant current Icr flows through the diode D2. Then, at time t3, the voltage Vs is half the voltage of the input voltage Vin. In association therewith, the resistors 64 and 65 in FIG. 2 generate the voltage Vs_div corresponding to the voltage Vs, and the comparator 80 in FIG. 3 outputs the low signal sw_ctrl.

In this event, the switch 92 in FIG. 3 is turned on in response to the low signal sw_ctrl, and the voltage output circuit 81 outputs the ground voltage to the node A. Accordingly, the voltage output circuit 81 discharges the capacitor 54 through the variable resistance circuit 82. At this time, the averaged circuit 66 supplies the current Ica to the capacitor 54. Then, the same operation is repeated from time t4.

Note that, although details will be described later, the current Ica is smaller for the same voltage Vis when the resistance value of the variable resistance circuit 82 is the resistance value Rb than when the resistance value is the resistance value Ra. Therefore, the averaged circuit 66 generates the voltage Vca smaller for the same voltage Vis when the resistance value of the variable resistance circuit 82 is the resistance value Rb than when the resistance value is the resistance value Ra.

<<<Operation of Control IC 40a>>>

Figure 7:
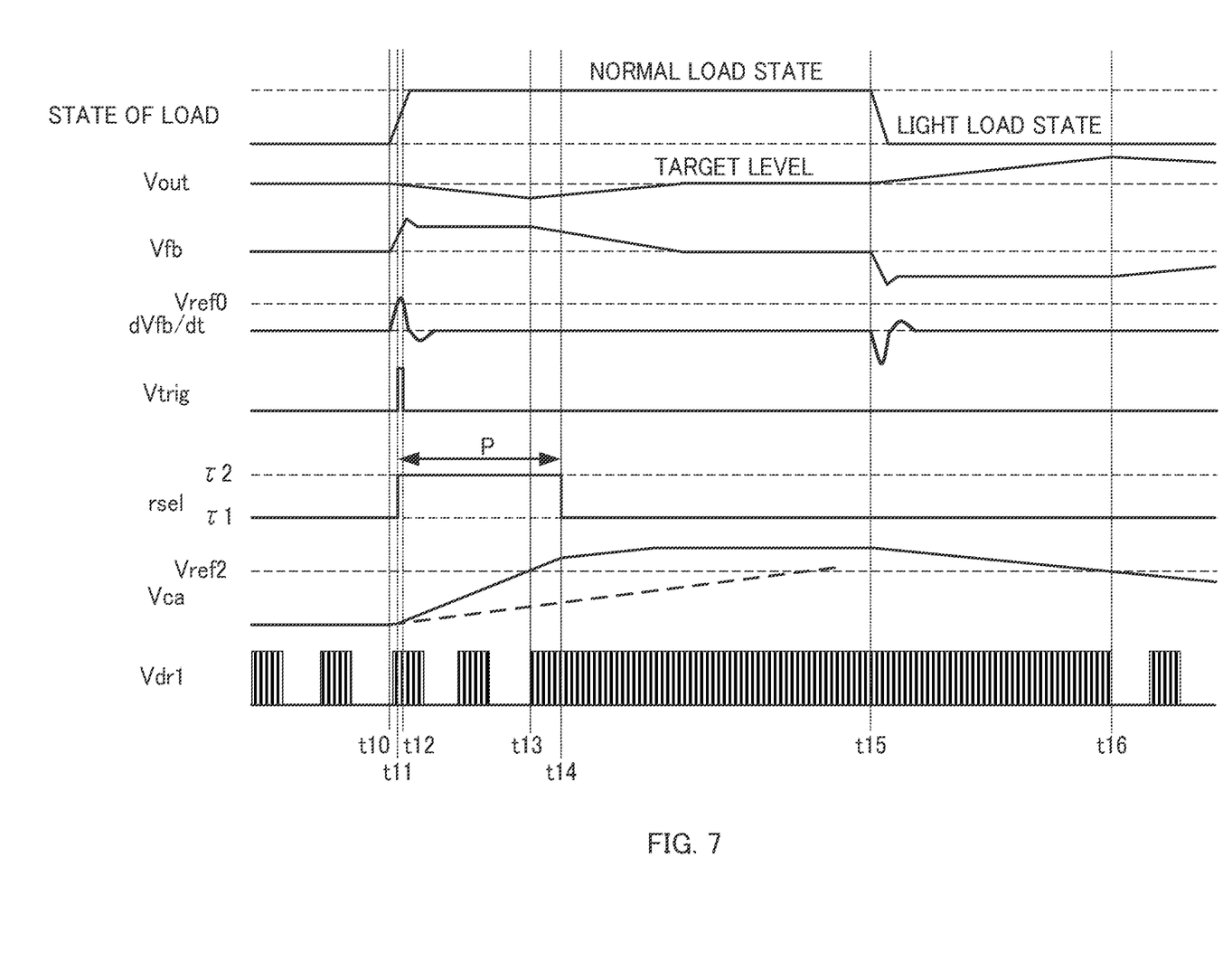

FIG. 7 is a diagram illustrating an example of an operation of the control IC 40a. It is assumed that, before time t10, the load 11 is in the light load state. Then, in this case, it is assumed that the control IC 40a switches the NMOS transistors 24 and 25 such that the continuous switching operation and the stop operation of intermittently stopping the switching operation are repeated.

In response to the state of the load 11 suddenly changing to the normal load state the time t10, the output voltage Vout drops. In response to the output voltage Vout dropping, the current Il flowing from the phototransistor 52 decreases, and thus the feedback voltage Vfb rises.

Since the state of the load 11 suddenly changes to the normal load state, the differentiator circuit 62 outputs the high signal Vtrig at time t11 at which the voltage dVfb/dt obtained by differentiating the feedback voltage Vfb (i.e., a change amount of the voltage Vfb per time) exceeds the reference voltage Vref0. In response to the differentiator circuit 62 outputting the high signal Vtrig, the control circuit 63 outputs the high signal rse1. Accordingly, the resistance value of the variable resistance circuit 82 results in a small resistance value Ra. As a result, the "time constant i" is the time constant T2 shorter than the time constant T1.

When the resistance value of the variable resistance circuit 82 is the resistance value Ra, the current Ica flowing through the capacitor 54 increases further than that when the resistance value of the variable resistance circuit 82 is the resistance value Rb, even if the voltage Vis is equal, because the magnitude of the resonant current Icr is equal.

Thus, when the high signal rse1 is inputted to the variable resistance circuit 82, the increased current Ica is supplied to the capacitor 54, and thus the slope with which the voltage Vca rises (i.e., the change amount of the voltage Vca per time) increases. Note that the dashed line shown in a place of the voltage Vca in FIG. 7 indicates the slope with which the voltage Vca rises when the resistance value of the variable resistance circuit 82 is the resistance value Rb (i.e., when the "time constant i" is the time constant t1).

At time t12, at which the voltage dVfb/dt obtained by differentiating the feedback voltage Vfb drops below the reference voltage Vref0, the differentiator circuit 62 outputs the low signal Vtrig. Then, after the feedback voltage Vfb suddenly rises due to a sudden change in the state of the load 11 to the normal load state, until the voltage Vca reaches the reference voltage Vref2, the NMOS transistors 24 and 25 are switched similarly to before the time t10, and thus the output voltage Vout continues to drop. Since the output voltage Vout significantly drops below the target level, the feedback voltage Vfb is substantially flat.

At time t13, at which the voltage Vca exceeds the reference voltage Vref2, the control IC 40a switches the NMOS transistors 24 and 25 by the continuous switching operation.

Au such, when the current Ica increases and the slope with which the voltage Vca rises increases, the control IC 40a more rapidly switches the NMOS transistors 24 and 25 by the continuous switching operation than when the resistance value of the variable resistance circuit 82 is the resistance value Rb. Accordingly, even when the state of the load 11 suddenly changes to the normal load state, the control IC 40a can rapidly change the drive mode of the NMOS transistors 24 and 25 and suppress a drop in the output voltage Vout. Since the control IC 40a drives the NMOS transistors 24 and 25 by the continuous switching operation, the output voltage Vout starts rising, and the feedback voltage Vfb accordingly starts dropping.

At time t14, at which the predetermined time period P has elapsed since the differentiator circuit 62 outputs the high signal Vtrig, the control circuit 63 outputs the low signal rse1. In response to the low signal rse1, the resistance value of the variable resistance circuit 82 is a great resistance value Rb. Accordingly, the current Ica is limited further than the case of being the resistance value Ra, and the slope with which the voltage Vca rises becomes smaller.

At time t15, at which the state of the load 11 becomes the light load state, the output voltage Vout rises, and the feedback voltage Vfb drops. The voltage dVfb/dt obtained by differentiating the feedback voltage Vfb drops and does not exceed the reference voltage Vref0. Therefore, the differentiator circuit 62 does not output the high signal Vtrig. Thus, when the output voltage Vout rises, the control circuit 63 does not output the high signal rse1. The resistance value of the variable resistance circuit 82 remains to be the resistance value Rb, and the "time constant i" remains to be the time constant t1.

At time t16, at which the voltage Vca drops below the reference voltage Vref2, the control IC 40a switches the NMOS transistors 24 and 25 such that the continuous switching operation and the stop operation of intermittently stopping the switching operation are repeated.

Other Embodiments

<<<Details of Control IC 40b>>>

Figure 8:
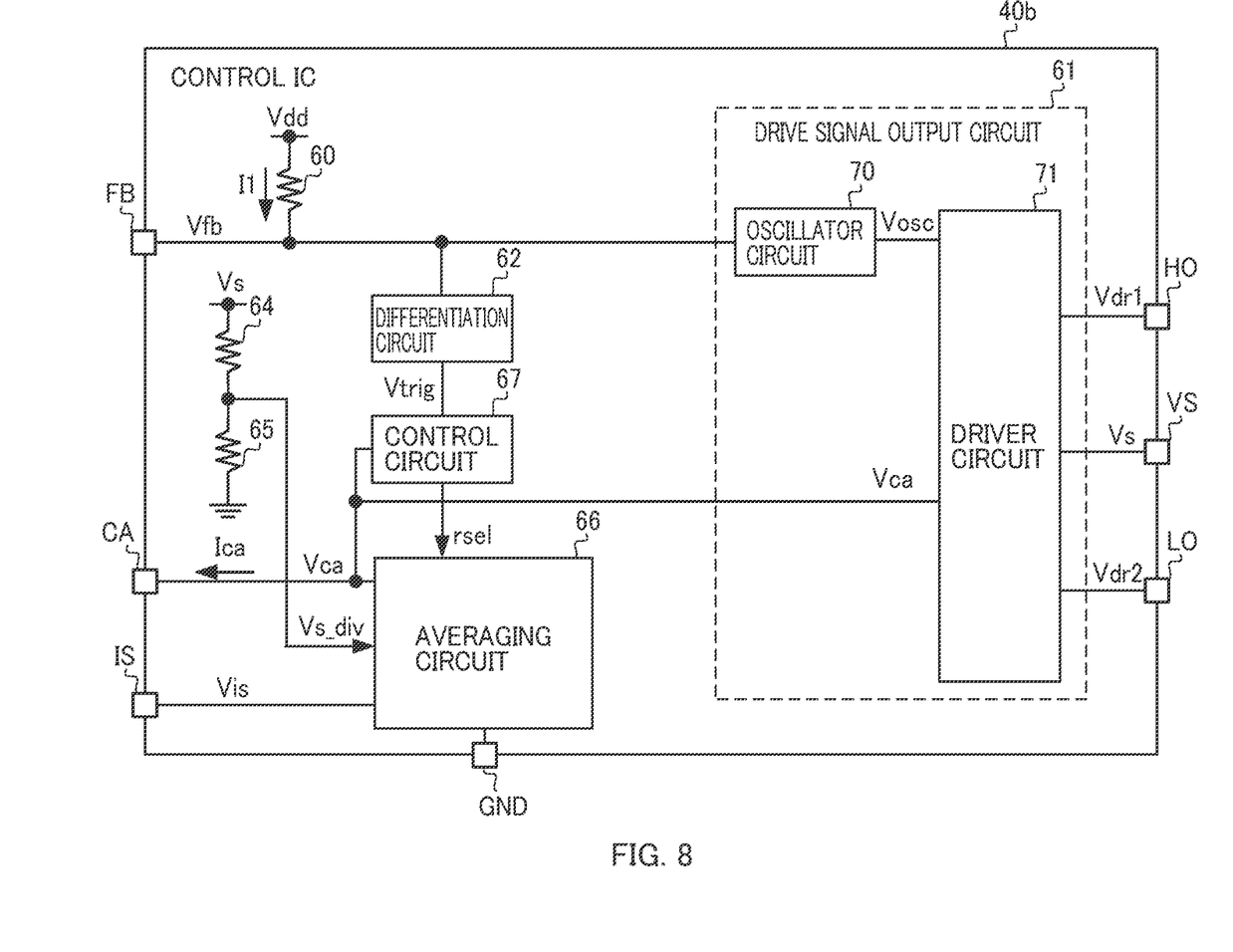
FIG. 8 is a diagram illustrating an example of a control IC 40b.

FIG. 8 is a diagram illustrating an example of the control IC 40b. In FIG. 8, parts or elements that are the same as those illustrated in FIG. 2 are given the same reference numerals, and a description thereof is omitted.

When the output voltage Vout has dropped and the change amount dVfb/dt of the voltage Vfb per time results in being greater than the predetermined value, the control circuit 67 controls the averaged circuit 66 such that the current Ica increases, until the voltage Vca reaches the reference voltage Vref2. Specifically, when the output voltage Vout has dropped and the change amount dVfb/dt of the voltage Vfb per time results in being greater than a predetermined value, the control circuit 67 outputs the high signal rse1. Subsequently, the control circuit 67 outputs the low signal rse1 in response to the voltage Vca exceeding the reference voltage Vref2. Note that the reference voltage Vref2 corresponds to a "predetermined level".

<<<Operation of Control IC 40*b*>>>

Figure 9:
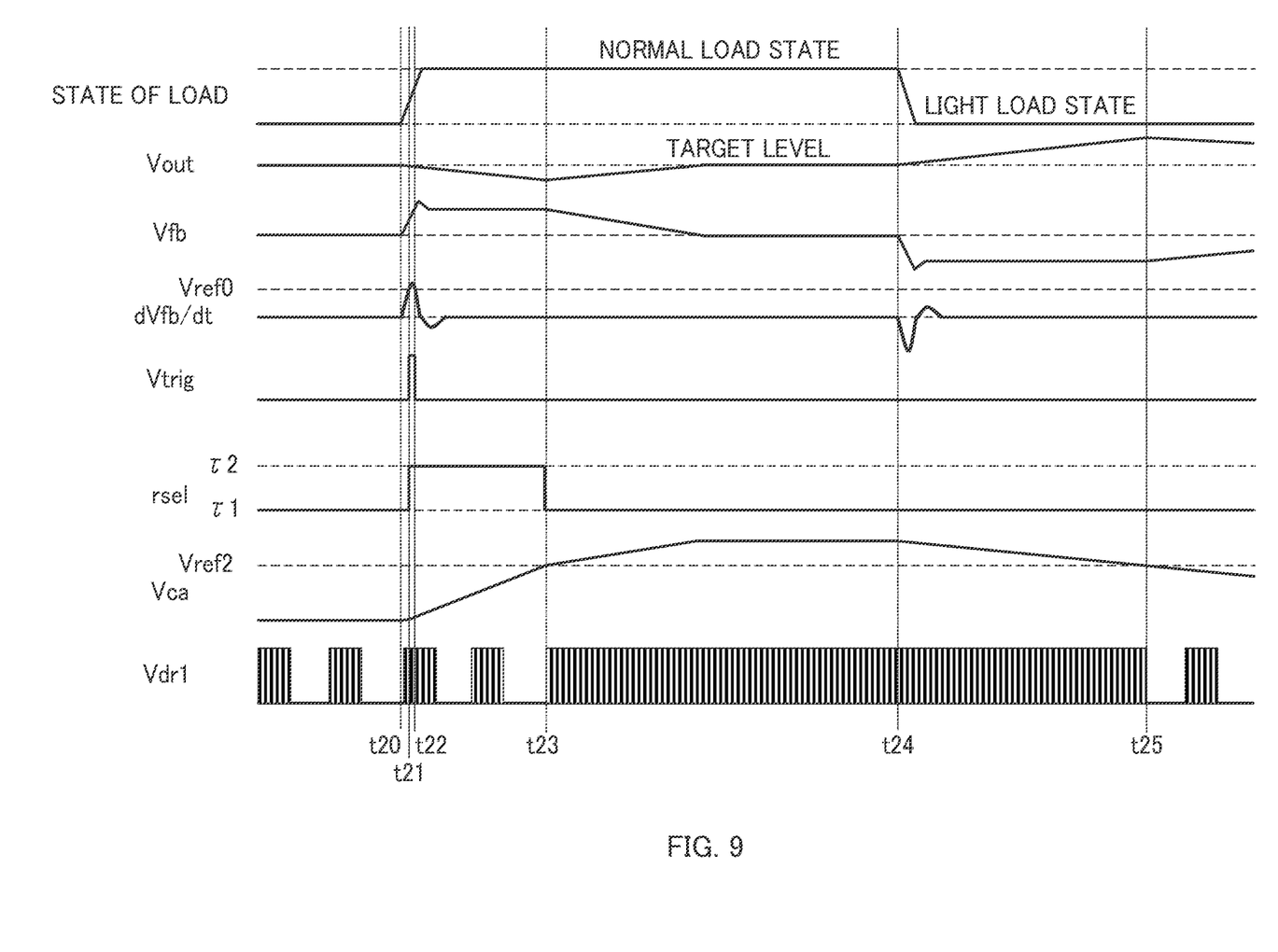
FIG. 9 is a diagram illustrating an example of an operation of the control IC 40b.

FIG. 9 is a diagram illustrating an example of an operation of the control IC 40*b*. Note that the operation from time t20 to time t22 in FIG. 9 is the same as the operation from the time t10 to the time t12 in FIG. 7, and thus a description thereof is omitted. Similarly, the operation from time t24 to time t25 in FIG. 9 is the same as the operation from the time t15 to the time t16 in FIG. 7, and thus a description thereof is omitted.

At time t23, at which the voltage Vca exceeds the reference voltage Vref2, the control circuit 67 in FIG. 8 outputs the low signal rse1. Accordingly, the resistance value of the variable resistance circuit 82 in FIG. 3 is the resistance value Rb. Also, the "time constant i" is the time constant t1.

SUMMARY

The switching power supply circuit 10 according to embodiments of the present disclosure has been described above. The control IC 40*a* includes the terminal CA, the averaged circuit 66, the driving signal output circuit 61, and the control circuit 63. When the output voltage Vout has dropped and the change amount dVfb/dt of the voltage Vfb per time results in being greater than the predetermined value, the control circuit 63 controls the averaged circuit 66 such that the current Ica increases and then decreases. This makes it possible to provide an integrated circuit that rapidly change the drive mode of a switching device so as to shorten a time period during which an output voltage drops.

When the output voltage Vout has dropped and the change amount dVfb/dt of the voltage Vfb per time results in being greater than the predetermined value, the control circuit 63 controls the averaged circuit 66 such that the current Ica increases only for the predetermined time period P. Accordingly, even when the state of the load 11 suddenly changes from the light load state to the normal load state, the control IC 40*a* can rapidly change the drive mode of the NMOS transistors 24 and and suppress a drop in the output voltage Vout.

When the output voltage Vout has dropped and the change amount dVfb/dt of the voltage Vfb per time results in being greater than the predetermined value, the control circuit 67 controls the averaged circuit 66 such that the current Ica increases, until the voltage Vca reaches the reference voltage Vref2. This makes it possible to shorten the time period during which the slope with which the voltage Vca rises increases, and to suppress a rise in the voltage Vca after the drive mode of the NMOS transistors 24 and 25 has been rapidly changed.

The averaged circuit 66 includes the comparator 80, the voltage output circuit 81, and the variable resistance circuit 82. The resistance value of the variable resistance circuit 82 is the resistance value Ra when the control circuit 63 increases the current Ica, and the resistance value of the variable resistance circuit 82 is the resistance value Rb greater than the resistance value Ra when the control circuit 63 decreases the current Ica. As such, the resistance value that limits the current Ica decreases, and therefore when the output voltage Vout has dropped and the change amount dVfb/dt of the voltage Vfb per time results in being greater than the predetermined value, it is possible to increase the current Ica and to increase the slope with which the voltage Vca rises. Then, the control IC 40*a* can rapidly change the drive mode of the NMOS transistors 24 and 25 and suppress a drop in the output voltage Vout.

The control IC 40*a* includes the differentiator circuit 62. The control circuit 63 detects, based on the signal Vtrig, that the output voltage Vout drops and the change amount dVfb/dt of the voltage Vfb per time results in being greater than the predetermined value. This enables the control IC 40*a* to easily detect that the state of the load 11 suddenly changes to the normal load state and the output voltage Vout drops.

The control IC 40*a* includes the averaged circuit 66, the driving signal output circuit 61, and the control circuit 63. When the output voltage Vout has dropped and the change amount dVfb/dt of the voltage Vfb per time results in being greater than the predetermined value, the control circuit 63 controls the averaged circuit 66 such that the change amount of the voltage Vca per time increases and then decreases. This makes it possible to provide an integrated circuit that rapidly change the drive mode of a switching device so as to shorten a time period during which an output voltage drops.

When the output voltage Vout has dropped and the change amount dVfb/dt of the voltage Vfb per time results in being greater than the predetermined value, the control circuit 63 controls the averaged circuit 66 such that the change amount of the voltage Vca per time increases only for the predetermined time period P. Accordingly, even when the state of the load 11 suddenly changes from the light load state to the normal load state, the control IC 40*a* can rapidly change the drive mode of the NMOS transistors 24 and 25 and suppress a drop in the output voltage Vout.

When the output voltage Vout has dropped and the change amount dVfb/dt of the voltage Vfb per time results in being greater than the predetermined value, the control circuit 67 controls the averaged circuit 66 such that the change amount of the voltage Vca per time increases, until the voltage Vca reaches the reference voltage Vref2. This makes it possible to shorten the time period during which the change amount of the voltage Vca per time increases, and to suppress a rise in the voltage Vca after the drive mode of the NMOS transistors 24 and 25 has been rapidly changed.

The averaged circuit 66 includes the comparator 80, the voltage output circuit 81, and the variable resistance circuit 82. The resistance value of the variable resistance circuit 82 is the resistance value Ra when the control circuit 63 increases the change amount of the voltage Vca per time. On the other hand, the resistance value of the variable resistance circuit 82 is the resistance value Rb greater than the resistance value Ra when the control circuit 63 decreases the change amount of the voltage Vca per time. As such, the resistance value that limits the current Ica decreases, and therefore when the output voltage Vout has dropped and the change amount dVfb/dt of the voltage Vfb per time results in being greater than the predetermined value, it is possible to increase the current Ica and to increase the change amount of the voltage Vca per time. Then, the control IC 40*a* can rapidly change the drive mode of the NMOS transistors 24 and and suppress a drop in the output voltage Vout.

The control IC 40*a* includes the differentiator circuit 62. The control circuit 63 detects, based on the signal Vtrig, that the output voltage Vout drops and the change amount dVfb/dt of the voltage Vfb per time results in being greater than the predetermined value. This enables the control IC 40a to easily detect that the state of the load 11 suddenly changes from the light load state to the normal load state and the output voltage Vout drops.

The present disclosure is directed to provision of an integrated circuit that rapidly change the drive mode of a switching device so as to shorten a time period during which an output voltage drops.

According to the present disclosure, it is possible to provide an integrated circuit that rapidly change the drive mode of a switching device so as to shorten a time period during which an output voltage drops.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. An integrated circuit for a power supply circuit that generates an output voltage of a target level, the power supply circuit including
    a transformer including a primary coil and a secondary coil,
    a first transistor and a second transistor configured to control a current of the primary coil, and
    a resonant circuit including the primary coil and a first capacitor,
the power supply circuit driving a load with a load current flowing therethrough, the integrated circuit being configured to control switching of the first transistor and the second transistor of the power supply circuit, the integrated circuit comprising:
    a terminal configured to have a second capacitor coupled thereto;
    a voltage generator circuit configured
        to supply a first current to the second capacitor in response to a resonant current of the resonant circuit, and
        to generate, at the second capacitor, a first voltage corresponding to the load current flowing through the load of the power supply circuit;
    a driving signal output circuit configured to output a driving signal for driving the first transistor and the second transistor, based on the first voltage and a feedback voltage corresponding to the output voltage; and
    a control circuit configured to control the voltage generator circuit such that, when the output voltage drops and a derivative of the feedback voltage at a time point becomes greater than a predetermined value, the first current increases and then decreases.

2. The integrated circuit according to claim 1, wherein the control circuit controls the voltage generator circuit such that, when the output voltage drops and the derivative of the feedback voltage at the time point becomes greater than the predetermined value, the first current increases for a predetermined period.

3. The integrated circuit according to claim 1, wherein the control circuit controls the voltage generator circuit such that, when the output voltage drops and the derivative of the feedback voltage at the time point becomes greater than the predetermined value, the first current increases until the first voltage reaches a predetermined level.

4. The integrated circuit according to claim 1, wherein the voltage generator circuit includes
    a control signal output circuit configured to output a control signal having a logic level,
    a voltage output circuit configured to
        output a voltage depending on the resonant current when the logic level of the control signal is a first level, and
        output a predetermined voltage when the logic level of the control signal is a second level, and
    a variable resistance circuit provided between the voltage output circuit and the terminal, the variable resistance circuit having a resistance value that
        is a first resistance value when the control circuit increases the first current, and
        is a second resistance value greater than the first resistance value when the control circuit reduces the first current.

5. The integrated circuit according to claim 4, further comprising:
    a differentiator circuit configured to differentiate the feedback voltage, wherein
    the control circuit detects, based on an output of the differentiator circuit, that the output voltage drops and the derivative of the feedback voltage at the time point becomes greater than the predetermined value.

6. A power supply circuit configured to generate an output voltage of a target level, and driving a load with a load current flowing therethrough, the power supply circuit comprising:
    a transformer including a primary coil and a secondary coil;
    a first transistor and a second transistor configured to control a current of the primary coil;
    a first capacitor forming a resonant circuit with the primary coil;
    a second capacitor; and
    an integrated circuit configured to control switching of the first transistor and the second transistor, wherein the integrated circuit includes
        a terminal to which the second capacitor is coupled;
        a voltage generator circuit configured
            to supply a first current to the second capacitor in response to a resonant current of the resonant circuit, and
            to generate, at the second capacitor, a first voltage corresponding to the load current flowing through the load of the power supply circuit;
        a driving signal output circuit configured to output a driving signal for driving the first transistor and the second transistor, based on the first voltage and a feedback voltage corresponding to the output voltage; and
        a control circuit configured to control the voltage generator circuit such that, when the output voltage drops and a derivative of the feedback voltage at a time point becomes greater than a predetermined value, the first current increases and then decreases.

7. An integrated circuit for a power supply circuit that generates an output voltage of a target level, the power supply circuit including
    a transformer including a primary coil and a secondary coil,
    a first transistor and a second transistor configured to control a current of the primary coil,
    a resonant circuit including the primary coil and a first capacitor, and
    a current detection circuit configured to receive a resonant current of the resonant circuit and generate a current detection voltage, the integrated circuit being configured to control switching of the first transistor and the second transistor of the power supply circuit, the integrated circuit comprising:
- an averaged circuit configured to generate a load-current instruction voltage by averaging the current detection voltage received from the current detection circuit;
- a driving signal output circuit configured to output a driving signal for driving the first transistor and the second transistor, based on the load-current instruction voltage and a feedback voltage corresponding to the output voltage; and
- a control circuit configured to control the averaged circuit such that, when the output voltage drops and a derivative of the feedback voltage at a time point becomes greater than a predetermined value, a derivative of the load-current instruction voltage at each time point thereafter increases and then decreases.

8. The integrated circuit according to claim 7, wherein the control circuit controls the averaged circuit such that, when the output voltage drops and the derivative of the feedback voltage at the time point becomes greater than the predetermined value, the derivative of the load-current instruction voltage increases for a predetermined period.

9. The integrated circuit according to claim 7, wherein the control circuit controls the averaged circuit such that, when the output voltage drops and the derivative of the feedback voltage at the time point becomes greater than the predetermined value, the derivative of the load-current instruction voltage increases, until the load-current instruction voltage reaches a predetermined level.

10. The integrated circuit according to claim 7, further comprising:
- a terminal configured to have a second capacitor coupled thereto, wherein
- the averaged circuit includes
  - a control signal output circuit configured to output a control signal having a logic level,
  - a voltage output circuit configured to
    - output a voltage depending on the resonant current when the logic level of the control signal is a first level, and
    - output a predetermined voltage when the logic level of the control signal is a second level, and
  - a variable resistance circuit provided between the voltage output circuit and the terminal, the variable resistance circuit having a resistance value that
    - is a first resistance value when the control circuit increases the derivative of the load-current instruction voltage, and
    - is a second resistance value greater than the first resistance value when the control circuit reduces the derivative of the load-current instruction voltage.

11. The integrated circuit according to claim 10, further comprising:
- a differentiator circuit configured to differentiate the feedback voltage, wherein
- the control circuit detects, based on an output of the differentiator circuit, that the output voltage drops and the derivative of the feedback voltage at the time point becomes greater than the predetermined value.

12. A power supply circuit configured to generate an output voltage of a target level, the power supply circuit comprising:
- a transformer including a primary coil and a secondary coil;
- a first transistor and a second transistor configured to control a current of the primary coil;
- a first capacitor forming a resonant circuit with the primary coil;
- a current detection circuit configured to receive a resonant current of the resonant circuit and generate a current detection voltage; and
- an integrated circuit configured to control switching of the first transistor and the second transistor, wherein the integrated circuit includes
- an averaged circuit configured to generate a load-current instruction voltage by averaging the current detection voltage received from the current detection circuit;
- a driving signal output circuit configured to output a driving signal for driving the first transistor and the second transistor, based on the load-current instruction voltage and a feedback voltage corresponding to the output voltage; and
- a control circuit configured to control the averaged circuit such that, when the output voltage drops and a derivative of the feedback voltage at a time point is greater than a predetermined value, a derivative of the load-current instruction voltage at each time point thereafter increases and then decreases.

\* \* \* \* \*